United States Patent [19]

Faint et al.

[11] Patent Number: 4,759,452
[45] Date of Patent: Jul. 26, 1988

[54] ARTICULATED LOAD BEARING WEAR PAD ASSEMBLY

[76] Inventors: Richard C. Faint, 9784 Cavell Cir., Bloomington, Minn. 55438; Leroy G. Krupke, 2002 White Ash, Carrollton, Tex. 75007

[21] Appl. No.: 17,319
[22] Filed: Feb. 20, 1987
[51] Int. Cl.$^4$ .............................................. B66C 23/00
[52] U.S. Cl. ..................................... 212/269; 52/118
[58] Field of Search ............... 212/266, 267, 268, 269; 384/247, 261, 299, 300, 908, 909; 52/118

[56] References Cited

U.S. PATENT DOCUMENTS

| | | | |
|---|---|---|---|
| 3,719,403 | 3/1973 | Sung | 212/269 |
| 3,719,404 | 3/1973 | Sterner | 212/269 |
| 3,796,016 | 3/1974 | Wu | 212/269 |
| 3,830,376 | 8/1974 | Fritsch | 212/269 |
| 4,004,695 | 1/1977 | Hockensmith et al. | 212/269 |
| 4,134,236 | 1/1979 | Ott | 212/269 |
| 4,264,265 | 4/1981 | Stoychoff | 212/269 |

FOREIGN PATENT DOCUMENTS 3101017  8/1982  Fed. Rep. of Germany ...... 212/269

*Primary Examiner*—Joseph F. Peters, Jr.
*Assistant Examiner*—Stephen P. Avila
*Attorney, Agent, or Firm*—Merchant, Gould, Smith, Edell, Welter & Schmidt

[57] ABSTRACT

A support shoe assembly (30,32) for a boom having telescoping inner and outer boom sections includes a pair of articulated wear pads (52) which are mounted at the outer end of the inner boom section in sliding engagement with the inner boom section. The wear pads (52) include rounded upper surfaces in sliding engagement with the outside lower corners of the inner boom section, and rounded lower surfaces supported in similarly contoured blocks (54) for rocking movement about a transverse axis to avoid point loading and reduce bending effects so that lighter boom sections can be utilized without reducing reach or loading capacity. The support blocks (54) are preferably mounted for adjustable lateral positioning for wear/play takeup and maintenance of proper frictional engagement between the contoured support pads (52) and the lower corners of the inner boom section.

6 Claims, 2 Drawing Sheets

ARTICULATED LOAD BEARING WEAR PAD ASSEMBLY

TECHNICAL FIELD

The present invention relates generally to a structural support, and more particularly to an articulated load bearing wear pad assembly for supporting overlapping ends of telescoping boom sections.

BACKGROUND ART

Telescoping booms are typically used in various material handling applications by reason of increased versatility. Booms of this type include tubular sections and are commonly found on mobile cranes and forklifts. All such telescoping booms necessarily include some type of sliding and/or rolling contact between adjacent boom sections to react the loads and yet allow for telescopic movement without undue wear or friction.

Various sliding shoe or wear pad arrangements have been provided heretofore for this purpose. For example, U.S. Pat. No. 3,796,016 to Wu shows a boom with telescoping tubular sections supported by bearing plates spanning the outside corners of the inner section. U.S. Pat. No. 4,004,695 to Bickersmith shows a telescopic crane boom with separate fixed wear pads between the top, bottom and sides of adjacent boom sections. German Pat. DE No. 3101017 shows another tubular boom section supported at its rounded lower corners by contoured fixed pads. The support pad arrangements of the prior art are mainly intended to provide for sliding contact, functioning to transfer loads between adjacent boom sections by compression. However, as adjacent boom sections extend, the loading on the wear pads, particularly those engaging the lower surface of the inner boom section, increases such that engagment there approaches a point contact, which in turn results in high bending stress. Therefore, because of limitations in their wear pad arrangements, these boom sections have had to be of relatively thick-walled construction in order to handle the necessary loads. This in turn has adversely affected performance of the crane by decreasing its maximum effective reach and load capacity. Heretofore, there has not been available a wear pad arrangement that addresses the stress factors effectively.

A need has thus arisen for an improved load bearing wear pad assembly which not only meets the requirements of minimum friction and drag, but also functions to transfer loads between overlapping ends of the boom sections more efficiently so that lighter boom sections can be used without compromising the effective reach or loading capacity of the crane.

SUMMARY OF INVENTION

The present invention comprises an articulated load bearing wear pad assembly which overcomes the foregoing and other difficulties associated with the prior art. In accordance with the invention, there is provided a wear pad assembly which is particularly adapted for use with tubular boom sections of square or rectangular cross-section having rounded corners. The wear pad assembly herein includes a pair of opposing front pads mounted at the outer end of the outer boom section. The inner faces of the front shoes are contoured to engage the lower corners of the adjacent inner boom section for sliding contact. The lower surfaces of the shoes are also contoured for sliding/rocking engagement in support blocks, each of which can be adjusted transverse to the boom in order to take up wear and to maintain the desired frictional contact between the boom sections.

DESCRIPTION OF DRAWINGS

A better understanding of the invention can be had by reference to the following Detailed Description in conjunction with the accompanying Drawings wherein.

DETAILED DESCRIPTION

Figure 1:
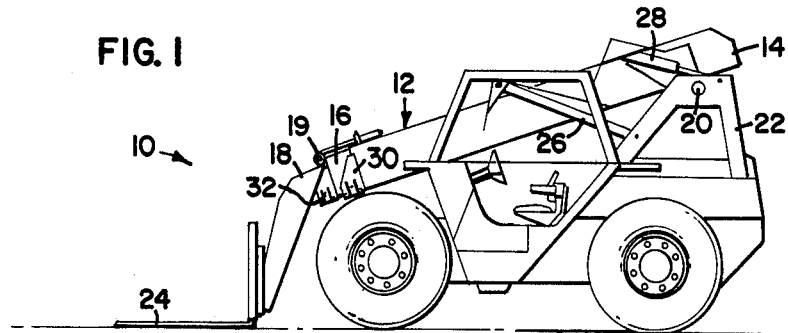
FIG. 1 is a side view of a mobile forklift with a telescoping boom, shown in retracted position, including the articulated load bearing wear pad assembly of the invention.

Referring now to the Drawings, wherein like reference numerals designate like or corresponding elements throughout the views, and particularly referring to FIG. 1, there is shown a variable reach forklift 10 including a pivotal, telescoping boom 12 of the type with which invention is particularly useful. The boom 12 includes a base section 14, mid-section 16, and tip section 18. Each boom section is preferably formed of structural steel tubing. The boom sections 14, 16 and 18 are activated between extended and retracted positions by a conventional chain, pulley, and cylinder arrangement 19. The base section 14 of boom 12 is pivoted at point 20 to a raised rear portion of the frame 22 of the forklift. A fork 24 is connected to the tip section 18. A cylinder 26 is coupled between frame 22 and the base section 14 for raising and lowering the boom 12 about the pivot point 20. A slave cylinder 28 is also coupled between boom 12 and frame 22 for maintaining constant orientation of the fork 24 during pivotal movement of the boom.

Articulated load bearing wear pad assemblies 30 and 32 of the invention are provided at the outer ends of the base section 14 and mid-section 16, respectively, for supporting overlapping ends of the corresponding boom sections. Each wear pad assembly 30 and 32 is of substantially identical construction, except that the wear pads of assembly 30 on base section 14 are somewhat longer than those of assembly 32 on the mid-boom section 16. For purposes of illustration, only the wear pad assembly 32 has been shown.

Figure 2:
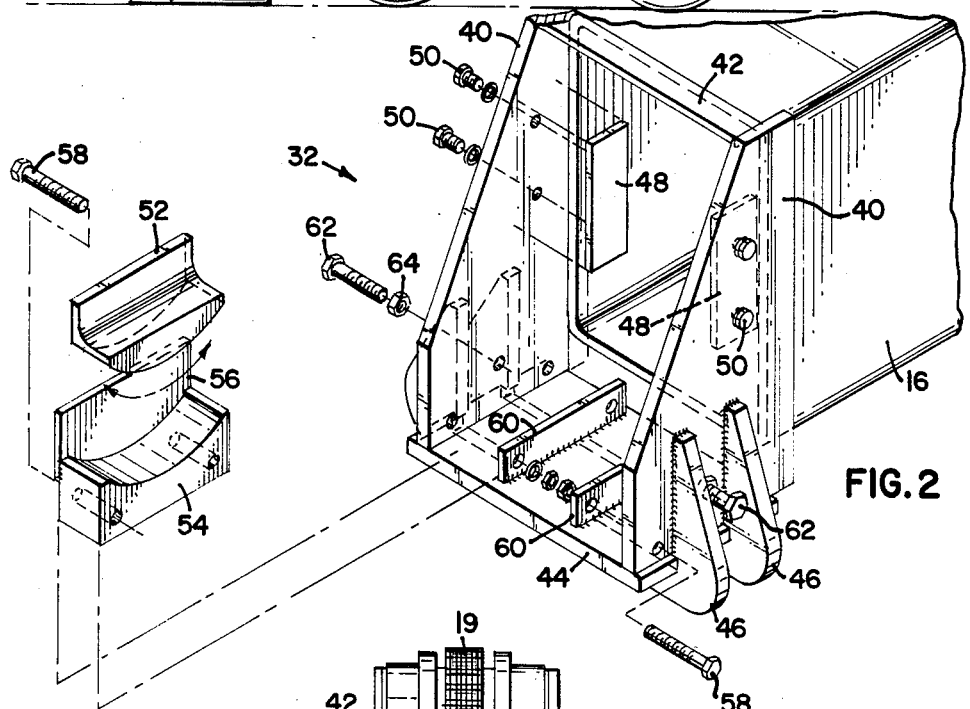
FIG. 2 is an exploded partial perspective view of the outer end of the mid-section of the boom.
Figure 3:
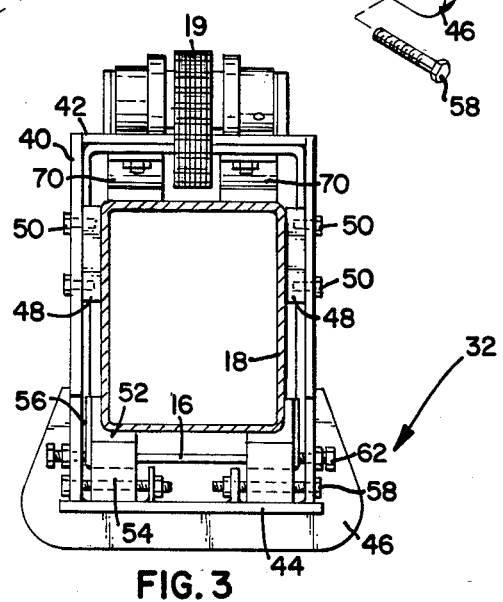
FIG. 3 is an enlarged sectional view taken along lines 3—3 of FIG. 5 in the direction of the arrows.
Figures 4, 5:
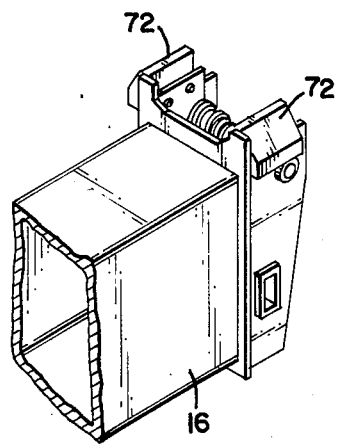
FIG. 4 is a partial perspective view of the inner end of the mid-section of the boom.
FIG. 5 is a side view of the mobile forklift of FIG. 1 with the boom partially raised and extended.

Referring to FIGS. 2–4, the wear pad assembly 32 includes a weldment secured to the outer end of the mid-section 16. The weldment includes a pair of side plates 40, a top plate 42, and a bottom plate 44 surrounding the outer end of mid-section 16. A pair of generally C-shaped gussets 46 extend beneath the bottom plate 44 upwards along the outside of the side plates 40. Plates 40, 42 and 44 and gussets 46 are preferably formed from steel plate welded together. A fixed wear pad 48 is provided on the inside of each side plate 40. The fixed slide shoes 48, which are preferably secured in place by bolts 50 extending through from the outside of plates 40, engage the outside of the adjacent inner boom section, which in the case of assembly 32, is the tip section 18.

Pads 48 are preferably constructed from low-friction polymeric material, such as ultra high molecular weight polyethylene.

A pair of articulated pads 52 are provided on the bottom plate 44. In particular, each pad 52 is of generally elongate configuration, having specially contoured surfaces. The upper/inner surface of each pad 52 is concave and of similar curvature to the lower outside corner of the adjacent tip section 18, which is supported for sliding contact thereby. The lower surface of each pad 52 is convex and of similar curvature to the concave upper surface of an underlying support block 54, so that pads 54 can rock or pivot about an axis transverse to the boom 12. The front pads 52 are preferably formed of suitable low-friction polymeric material such as Nylatron GSM from The Polymer Corp., Reading, PA. The pads 52 are thus supported for sliding engagement both with the inner boom section 16 and with the blocks 54 on the outer boom section 16. A back-up plate 56 is secured to the outside of each block 54. This comprises a significant feature of the invention, because the pads 52 not only provide for sliding contact, but can also rock slightly as necessary to avoid point contact and reduce bending on either boom section, particularly when extended.

In accordance with the preferred embodiment, each bottom pad 52 and support block 54 are laterally adjustable in order to take up play from wear on the pads and maintain the desired frictional engagement with the adjacent inner boom section 18. In particular, each block 54 is slidably supported on the shanks of a pair of bolts 58 (only one of which is shown) extending between the corresponding side plate 40 and a lug 60 secured to the top of the bottom plate 44. A bolt 62 is corresponding side plate 40 with its inner end engaging the backup plate 56 in order to compress the corresponding pad 52 inwardly against the adjacent boom section 18. After bolts 62 have been adjusted as desired, jam nuts 64 are tightened to maintain their positions. Each pad 52 and support block 54 can thus be individually adjusted, which comprises another significant feature of the present invention.

As is best seen in FIG. 3, a pair of front wear pads 70 are secured inside the mid section 16 near its outer end for sliding contact with the top surface of the adjacent inner tip section 18. A pair of rear wear pads 72, as is best seen in FIG. 4, are similarly provided on the outside rear end of the inner tip section 18 for sliding contact with the inside of the adjacent outer mid section 16. The front and rear wear plates 70 and 72 are of similar material to the side pads 46. It will be appreciated that the wear pads 48, 70 and 72 also perform a centering function.

From the foregoing, it will thus be apparent that the present invention comprises an improved load bearing wear pad assembly having several advantages over the prior art. One significant advantage involves the fact that the wear pad assembly herein achieves better load transfer between boom sections so that lighter boom sections can be used without affecting performance. Another advantage is convenient adjustability. Other advantages will be evident to those skilled in the art.

Although particular embodiments of the invention have been illustrated in the accompanying Drawings and described in the foregoing Detailed Description, it will be understood that the invention is not limited only to the embodiments disclosed, but it intended to embrace any alternatives, equivalents, modifications and/or rearrangements of elements falling within the scope of the invention as defined by the following Claims.

What is claimed is:

1. An articulated support shoe assembly for a crane having telescoping inner and outer boom sections, which comprises:
    each boom section being of tubular, generally rectangular cross-section with opposing walls and rounded corners;
    at least one first wear pad secured to the outer end of the outer boom section in sliding engagement with the inner boom section;
    at least one second wear pad secured to the inner end of the inner boom section in sliding engagement with the outer boom section;
    a pair of opposing third wear pads each having a curved upper surface in sliding engagement with an adjacent lower rounded corner of said inner boom section and adjacent wall portions thereof, and a curved lower surface;
    a pair of opposing support blocks mounted on the outer end of said outer boom section, each support block including a complementary curved upper surface in sliding engagement with the curved lower surface of the associated third wear pad in order to provide for rocking motion about an axis transverse to the crane; and
    means for adjustably supporting said support blocks relative to said inner boom section to maintain the desired contact between said inner boom section and said third wear pads;
    wherein said means for adjustably supporting said support blocks comprises:
    a weldment secured to the outer end of said outer boom section, said weldment including a pair of spaced-apart side plates innerconnected by a bottom plate;
    a pair of spaced-apart, longitudinal lugs secured to the bottom plate of said weldment between the side plates thereof, each support block being disposed between one lug and corresponding side plate;
    means for slideably supporting each support block for transverse movement between the associated lug and side plate of said weldment; and
    means for individually urging said support shoes away from the associated side plates of said weldment.

2. The support shoe assembly of claim 1, wherein said first and second wear pads are constructed from ultra high molecular weight polyethylene.

3. The support shoe assembly of claim 1, wherein said third wear pads are constructed from polymeric material.

4. The articulated support shoe assembly according to claim 1, wherein said means for urging said support shoes away from the side plates of said weldment comprises bolts threadedly engaged through the side plates and bearing against said support shoes.

5. The articulated support shoe assembly according to claim 1, further including:
    a pair of generally C-shaped, longitudinally spaced-apart gussets innerconnecting the side plates and extending beneath the bottom plate of said weldment.

6. The articulated support shoe assembly of claim 1, wherein each boom section includes opposing side walls, and further including:
    a pair of opposing fourth wear pads fixedly secured to the side walls of the outer boom section in sliding engagement with the side walls of the inner boom section.

* * * * *